(12) United States Patent
Nimmo

(10) Patent No.: US 6,335,852 B1
(45) Date of Patent: Jan. 1, 2002

(54) PROGRAMMABLE FUSE AND PROGRAMMING DEVICE FOR TIMER

(76) Inventor: James Nimmo, Inkonnokantie 22, FIN-90830 Haukipudas (FI)

(*) Notice: Subject to any disclaimer, the term of this patent is extended or adjusted under 35 U.S.C. 154(b) by 0 days.

(21) Appl. No.: 09/331,421

(22) PCT Filed: Dec. 18, 1997

(86) PCT No.: PCT/FI97/00807

§ 371 Date: Jul. 13, 1999

§ 102(e) Date: Jul. 13, 1999

(87) PCT Pub. No.: WO98/28830

PCT Pub. Date: Jul. 2, 1998

(30) Foreign Application Priority Data

Dec. 20, 1996 (FI) .................................................. 965176

(51) Int. Cl.[7] .............................................. H02H 3/00
(52) U.S. Cl. ...................................... 361/93.2; 361/93.6
(58) Field of Search ........................ 361/93.2, 93.6, 361/94, 103, 104, 626, 627, 628, 630, 631, 634; 700/83, 84, 292, 293, 296

(56) References Cited

U.S. PATENT DOCUMENTS

| | | | | |
|---|---|---|---|---|
| 4,991,042 A | * | 2/1991 | Tokarski et al. | 361/93.2 |
| 5,101,316 A | * | 3/1992 | Levain | 361/93.2 |
| 5,224,011 A | * | 6/1993 | Yalla et al. | 361/93.2 |
| 5,490,086 A | * | 2/1996 | Leone et al. | 700/292 |
| 5,710,691 A | * | 1/1998 | Fowler et al. | 361/94 |
| 5,825,643 A | * | 10/1998 | Dvorak et al. | 700/12 |
| 5,835,324 A | * | 11/1998 | Hatton | 361/93.2 |
| 5,856,711 A | * | 1/1999 | Kato et al. | 307/10.6 |
| 5,875,087 A | * | 2/1999 | Spencer et al. | 361/87 |
| 6,141,202 A | * | 10/2000 | Maeckel et al. | 361/187 |

FOREIGN PATENT DOCUMENTS

| | | |
|---|---|---|
| GB | 2 199 705 | 7/1988 |
| GB | 2 226 464 | 6/1990 |
| GB | 2 286 904 | 8/1995 |
| SE | 430 280 | 10/1983 |
| WO | WO 93/20577 | 10/1993 |

\* cited by examiner

*Primary Examiner*—Michael J. Sherry
(74) *Attorney, Agent, or Firm*—Young & Thompson

(57) ABSTRACT

A programming device and a programmable circuit breaker are provided for switching off electric current. The circuit breaker comprises a mechanism (208) to monitor the strength of electric current in a switching mechanism (210) to switch off the passage of the electric current through the circuit breaker. To enable versatile timing of electric appliances, the circuit breaker includes a device (218) to store one or more desired time periods, an interface (220) to a separate program device of the time periods, and a control device (216, 220) to control the switching element (210) on the basis of the time period stored.

13 Claims, 2 Drawing Sheets

PROGRAMMABLE FUSE AND PROGRAMMING DEVICE FOR TIMER

CROSS-REFERENCE TO RELATED APPLICATION

This is the 35 U.S.C. 371 national stage of international application PCT/FI97/00807 filed on Dec. 18, 1997, which designated the United States of America.

FIELD OF THE INVENTION

The present invention relates to a programmable circuit breaker for switching off electric current, the circuit breaker comprising means to monitor the strength of the electric current and means for switching off the passage of the electric current through the circuit breaker.

BACKGROUND OF THE INVENTION

Circuit breakers are used in a variety of environments to protect the environment and the users against faults in electric equipment and circuits. In a building, circuit breakers are generally placed in a centered manner in one location in connection with the building's main power switch inside the building.

It is previously known to place, in connection with the circuit breaker, some kind of an adjustable timer apparatus, with the aid of which it is possible to restrict the passage of electric current to the circuit behind the circuit breaker as a function of time. The most typical application is socket posts intended for the heating of vehicles, which posts, in addition to the socket, usually also comprise an automatic circuit breaker and a timer, which is used to switch on the circuit at the desired time of day, typically for a few hours.

FIG. 1 presents an example of the structure of an arrangement based on prior art in connection with a socket post. The arrangement comprises a connection to an electrical network 100, a socket 102 for coupling the vehicle's heater, an adjustable timer 104 which is used to set the desired switched-on time, a switch 106 which is controlled by the timer, and a device 108 which can be a conventional disposable fuse or a so-called circuit breaker. The known arrangements have been designed for single applications and their use is limited. In addition, their use requires fixed installations.

Further, so far it has not been possible to realize an effortless setting of time-based availability of electric current in electrical networks inside buildings. The timer switches used in industry are similar in structure to the above-mentioned solutions and require fixed installation.

There are also applications in which the setting of timer for the control of electric current must be possible only for certain persons. For example, in connection with sockets for cats~, this restriction of use is realized using lockable socket boxes. In buildings, this solution is impractical and requires separate installation. In old premises, this is not even possible owing to lack of space.

DESCRIPTION OF THE INVENTION

The object of the present invention is thus to realize an arrangement which can be used to effortlessly implement versatile timing in both new and existing buildings. The object of the invention is also to realize an arrangement which can be used to restrict the control of timing to certain persons or groups of persons.

This will be achieved with a circuit breaker of the type described in the preamble, which is characterized in that the circuit breaker comprises means to store one or more desired time periods, an interface to a separate programming device for the time periods and means to control the switching means on the basis of the time periods stored.

The invention also relates to a programming device for a timer, the device comprising a key pad, a display and an interface to the programmable device. The programming device according to the invention is characterized in that the device comprises means to store codes of different timers, means to store a security code which enables programming, and means to enable the use of the programming device when the stored security code is fed to the device.

The solution of the invention has many benefits. A programmable circuit breaker, such as in the invention, can be placed anywhere in place of a conventional circuit breaker, whereby the electrical network inside the building can be controlled on the basis of time. Thus, for example, the lighting of a room can be controlled by leaving the room's light switch in the "on" position and by using the circuit breaker to control the lights. The preferred embodiments of the invention can be seen in the independent claims.

DESCRIPTION OF THE DRAWINGS

In the following, the invention is explained in more detail by reference to the examples in the enclosed drawings, where.

PREFERRED EMBODIMENTS OF THE INVENTION

The present invention relates to a programmable circuit breaker, which comprises a timer, which can be programmed using a separate programming device, and memory for the storage of time periods set. In a preferred embodiment of the invention, a circuit breaker according to the invention can replace a conventional circuit breaker in a circuit breaker box, and the desired time periods can be stored in the circuit breaker, whereupon power is connected to the electrical network behind the circuit breaker.

Figure 1:
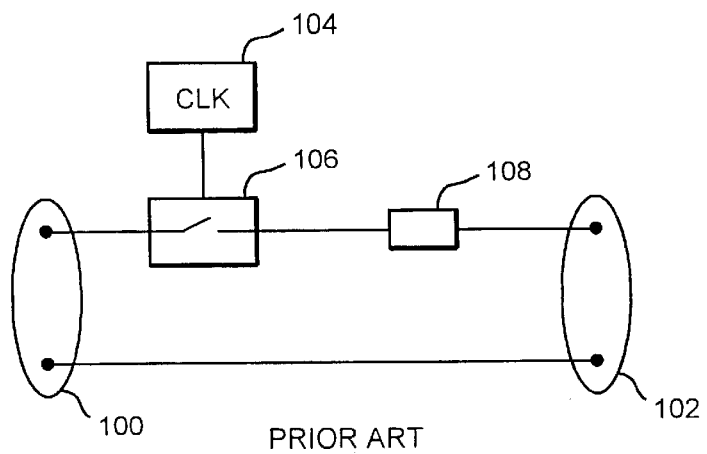
FIG. 1 presents the above-described example of a solution according to the prior art.
Figure 2:
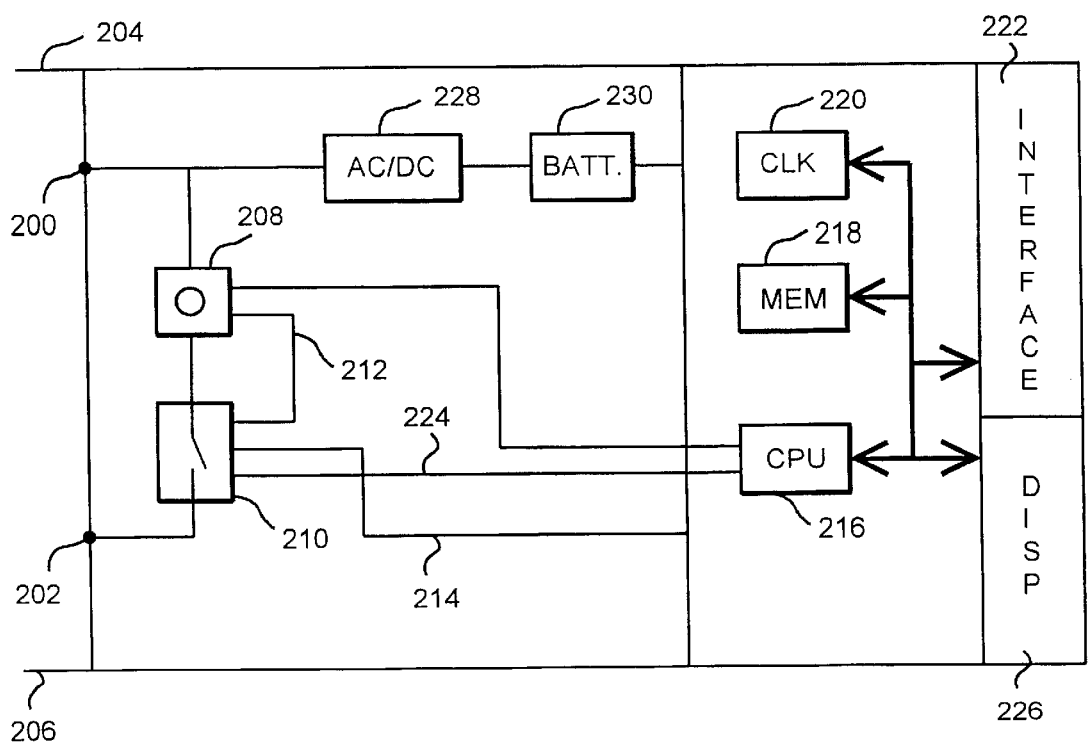
FIG. 2 illustrates an example of the structure of a circuit breaker according to the invention.

In the following, we shall discuss in more detail the structure of a preferred embodiment of the circuit breaker according to the invention with the help of the example presented in FIG. 2. The circuit breaker comprises connection means 200, 202 to the electrical network and fastening means 204, 206 for fastening the circuit breaker to the circuit breaker box. The connection and fastening means can be realized by using prior art technology so that the circuit breaker can be used in existing circuit breaker boxes. The circuit breaker comprises means 208 for monitoring the strength of the electric current between the circuit breaker connection means 200, 202. The circuit breaker also comprises switching means 210 used to switch off the passage of electric current between the circuit breaker connection means 200, 202. The switching means can be realized using e.g. relays. The means 208 thus monitor the strength of the current, and if the strength of the current exceeds the prescribed threshold, the means 208 control the relay 212 so that the passage of current through the circuit breaker is switched off. This is the normal functioning of the circuit breaker. The circuit breaker additionally comprises a control connection 214, which can be used to switch on the relay again after the electric current has been switched off owing t o overcharge. This control connection can be realized either manually, as in the existing circuit breakers, or with the aid of a programming unit described below. The circuit breaker can also attempt automatic reswitching e.g. three times after a minute's pause.

The circuit breaker according to the invention additionally comprises a control unit 216, memory means 218, a timer means 220 and an interface 222. The interface 222 is used to store one or more desired time periods in the memory means 218 of the circuit breaker, whereby the circuit breaker is desired either to enable or prevent the passage of electric current through the circuit breaker's connection means 200, 202. The control unit 216 together with the timer means 220 read the stored time periods from the memory 218 and control 224 the switching means 210 correspondingly. The switch is thus controlled to be "on" or "off" regardless of the strength of the electric current in accordance with the time periods stored in the memory.

The circuit breaker can additionally comprise means 226 to show the stored time periods and the status of the circuit breaker at any particular moment with the aid of light-emitting diodes or an LCD, for example. The status of the circuit breaker at that moment can be shown, for example, so that when the circuit breaker is on, a red LED is lit, and when the circuit breaker is off, a green LED is lit. In one alternative embodiment, the circuit breaker does not include a display, but instead, the status of the circuit breaker and the stored time periods can be verified with a separate programming device. In another alternative embodiment, the display means 226 give a warning when the electric current approaches the pre-set threshold value, where the relay goes off. The display means can also show detailed information on power consumption. The control unit 216 controls the function of the other parts of the circuit breaker, such as the display means 226. The control unit 216, the memory means 218 and the timer means 220 can be realized preferably by using a microprocessor or separate components at different levels of integration, as is obvious to one skilled in the art. The memory means 218 can be realized per se according to the prior art. A method according to the invention can in suitable parts preferably be realized through software in the control unit 216.

In general, circuit breaker boxes contain several circuit breakers. As will be presented below, a circuit breaker according to the invention can be programmed with a separate programming device, for example an infrared or wireless connect ion. A circuit breaker according to the invention comprises the means 218 for the storage of an individual code, which separates a circuit breaker from another. Thus in remote control, each circuit breaker can be controlled separately, with the aid of the individual code of each circuit breaker. A circuit breaker reacts to the control only if the individual code of the circuit breaker is sent in connection with the control.

The circuit breaker additionally comprises means 228 to take its operating voltage from the mains voltage system. In case of power cuts, the circuit breaker may also comprise a battery 230. On the other hand, the memory means 218 can also be realized With the aid of flash memory, whereupon a power cut will not cause the stored data to be erased and the battery 230 will thus be unnecessary.

The circuit breaker's interface to its programming device can be realized in many ways. The interface can be physical, comprising, for example, one or more contact surfaces. During the input of programming data, the programming device is then connected to the circuit breaker with the aid of a cable, for example. The interface can also be realized with the aid of an infrared or wireless connection in that case, the interface comprises either an infrared or a wireless receiver.

The circuit breaker can naturally be realized at different operating voltages and at different current limiting values.

Figure 3:
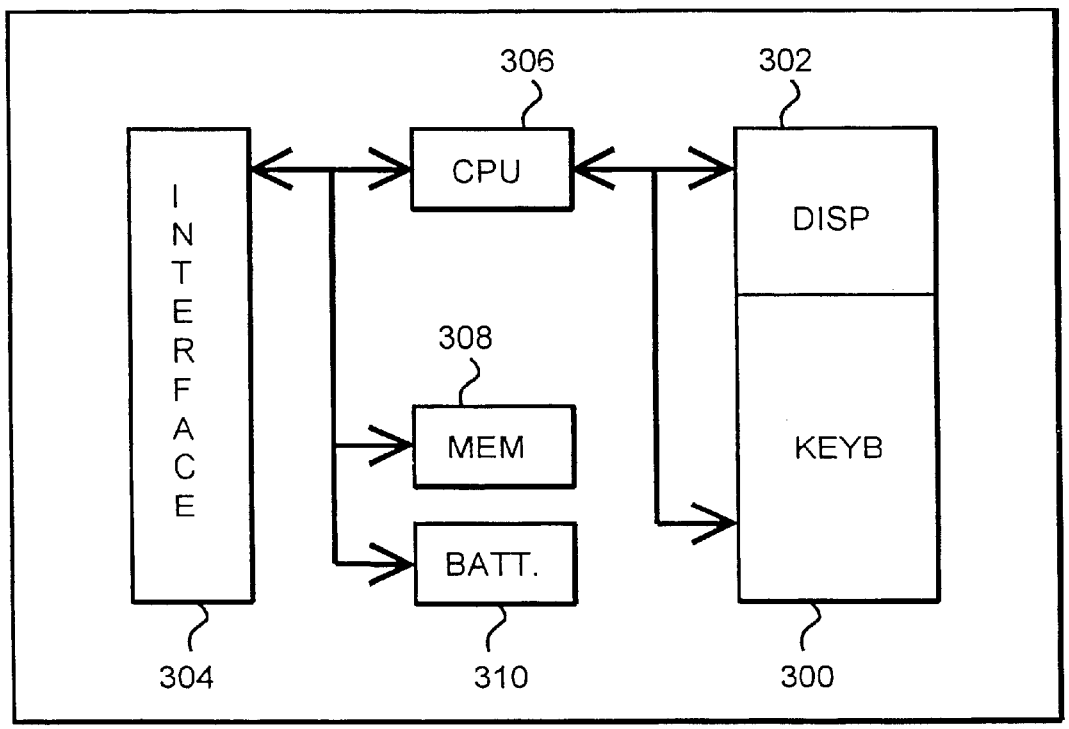
FIG. 3 illustrates an example of the structure of a programming device for a timer according to the invention.

Next we shall discuss in more detail the structure of a preferred embodiment of the programming device for a timer according to the invention with the aid of the example presented in FIG. 3. The programming device comprises a key pad 300 for the input of data in the piece of equipment and a display 302 which displays the data to be programmed. The programming device also comprises an interface 304, with the aid of which the programming device is in contact with the piece of equipment to be programmed. The interface can be used to realize the connection as a fixed connection with the aid of a cable or contact surfaces or as an infrared or radio connection, as was presented above in connection with the circuit breaker. The key pad is used to input in the pro-gramming device the desired data which the user wants to transmit to the programmable timer. The device comprises a control unit 306 and memory means 308, where the time periods are stored for transmission.

The memory means 308 can additionally be used to store the security code which enables programming. The purpose of this security code is to prevent an unauthorized programming of the timer. The equipment requests the security code on programming, and if the correct code is not provided, the control unit 306 prevents the completion of the programming. The memory means 308 can additionally be used to store codes of different timers, which makes it possible to control different timers with the same programming device. A programming device according to the invention can be used, not only in connection with the programming of the programmable circuit breaker, but also in programming the timers of other remote control equipment, for example the timer of a video cassette recorder.

In a preferred embodiment of the invention, the programming device receives its operating voltage through the interface 304. Thus, for example, in using a fixed connection between the circuit breaker and the programming device, the battery 310 of the programming device can be charged in making the first connection. Programming can then be carried out quickly without charging the battery until the battery becomes empty and charging is necessary again.

Although the invention has been discussed above with reference to an example as presented in the enclosed drawings, it is evident that the invention is not limited to that particular example alone, but instead, it can be modified in many ways within the scope of the inventive idea presented in the attached claims.

What is claimed is:

1. A programmable circuit breaker for switching off electric current, the circuit breaker comprising:
   fastening means for securing the circuit breaker to a circuit within a circuit breaker panel;
   means to monitor the strength of electric current through the circuit;
   means for switching off the passage of the electric current through the circuit breaker to switch off all current through the circuit;
   means to store one or more desired time periods; an interface to a separate programming device for the time periods; and means to control the switching means on the basis of the time periods stored.

2. A circuit breaker according to claim 1, wherein the circuit breaker further comprises means to display the time periods stored.

3. A circuit breaker according to claim 1, wherein the interface comprises one or several contact surfaces.

4. A circuit breaker according to claim 1, wherein the interface comprises an infrared receiver.

5. A circuit breaker according to claim 1, wherein the interface comprises a radio receiver.

6. A circuit breaker according to claim 1, wherein the circuit breaker also comprises means to take operating voltage from the mains voltage.

7. A circuit breaker according to claim 1, wherein the storage means are realized with the aid of a semiconductor memory.

8. A circuit breaker according to claim 1, wherein the circuit breaker comprises means to store an individual code, which separates a circuit breaker from another.

9. A programming device for a programmable circuit breaker for switching off electric current, the device comprising:

a key pad, a display, an interface to the programmable circuit breaker, means to store codes of different timers, means to store a security code which enables programming, and means to enable the use of the programming device when the stored security code is fed to the device, wherein the programmable circuit breaker is adapted for connection to an electrical circuit within a circuit breaker panel.

10. A programming device according to claim 9, wherein the programming device receives its operating voltage through the interface.

11. A programming device according to claim 9, wherein the interface is formed by contact surfaces.

12. A programming device according to claim 9, wherein the interface is a wireless connection to the device to be programmed.

13. A programming device according to claim 10, wherein the programming device comprises a rechargeable source of voltage.

* * * * *